O. MATSON.
Grading Apparatus.
No. 148,728.
Patented March 17, 1874.
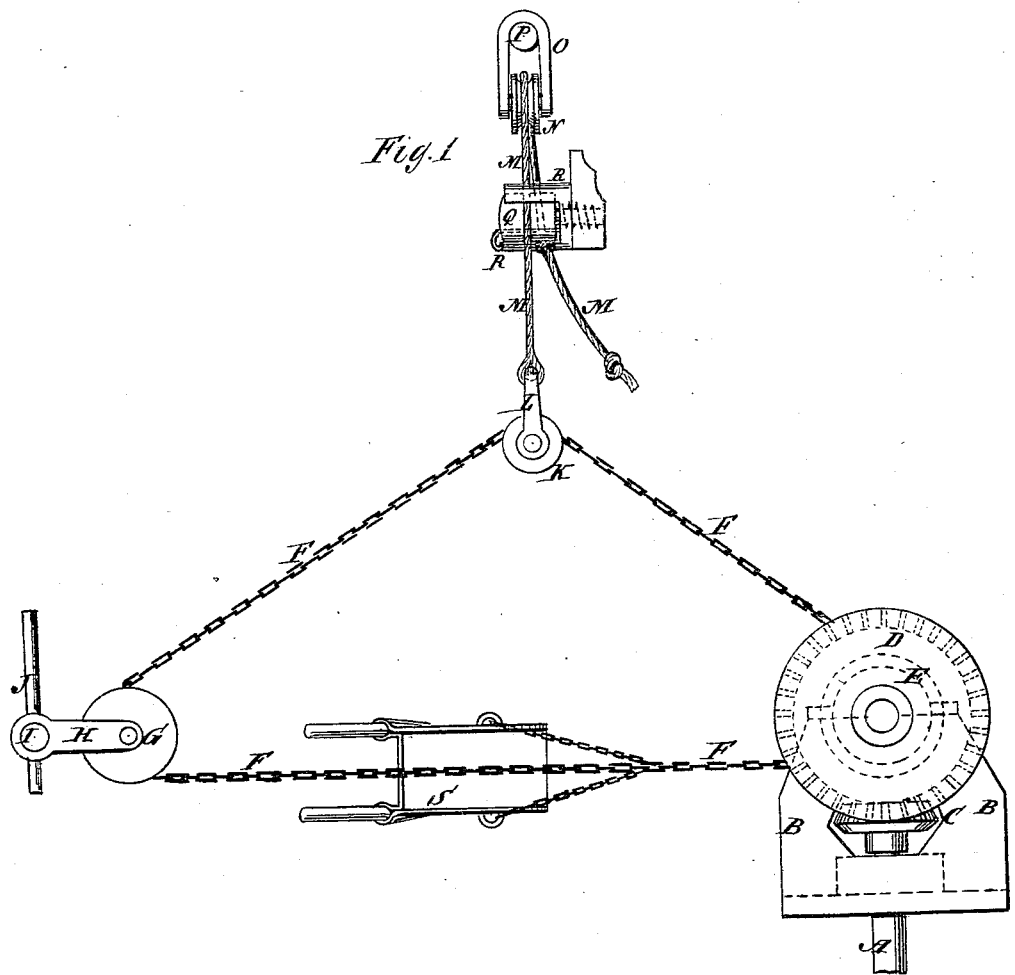
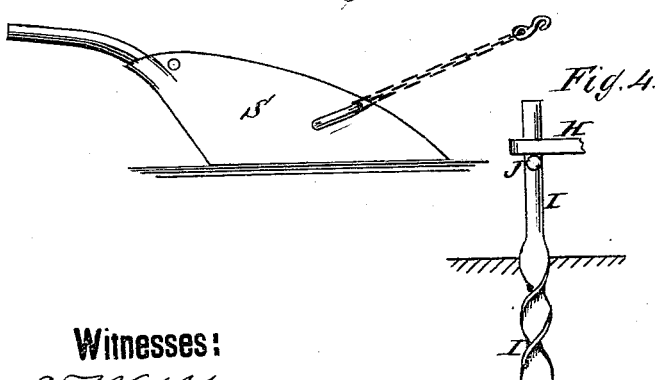
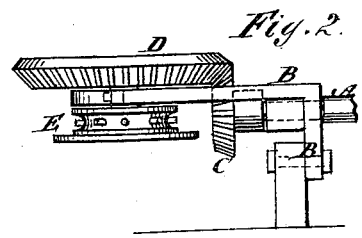
Witnesses:
E. Wolff
Sedgwick
Inventor:
O. Matson
Per
Attorneys.

UNITED STATES PATENT OFFICE.

OLE MATSON, OF MOLINE, ILLINOIS.

IMPROVEMENT IN GRADING APPARATUS.

Specification forming part of Letters Patent No. 148,728, dated March 17, 1874; application filed January 24, 1874.

*To all whom it may concern:*

Be it known that I, OLE MATSON, of Moline, in the county of Rock Island and State of Illinois, have invented a new and useful Improvement in Grading Apparatus, of which the following is a specification:

Figure 1 is a plan view of my improved apparatus. Fig. 2 is a detail side view of the driving mechanism. Fig. 3 is a detail side view of one of the scrapers. Fig. 4 is a detail side view of one of the screw-posts.

Similar letters of reference indicate corresponding parts.

My invention has for its object to furnish an improved apparatus for moving earth from one place to another in grading roads, lawns, &c., which shall be simple in construction, convenient in use, and efficient in operation, doing the work rapidly and well, and at much less expense than when done in the ordinary manner.

The invention will first be fully described, and then pointed out in the claims.

A is the driving-shaft, to which motion is given by a steam-engine or other convenient power, and which revolves in bearings in a frame, B, staked to the ground or otherwise secured in place. To the inner end of the shaft A is secured a small bevel-gear wheel, C, the teeth of which mesh into the teeth of a large bevel-gear wheel, D, pivoted to the said frame B, and with the lower journal of which is rigidly connected a spur-wheel or pulley, E, around which passes an endless chain or wire rope, F. The wheel or pulley E is made with a flange around the lower edge of its face to prevent the chain or rope F from dropping off. The chain or rope F also passes around a grooved pulley, G, pivoted to one end of an arm or bar, H, the other end of which has a hole formed through it to allow it to be placed upon the post I. The post I has a spiral or screw-thread formed upon its lower end to enable it to be readily forced into the ground, and has a lever, J, attached to its upper part for convenience in forcing it into and out of the ground. The lever J also serves as a stop to prevent the bar H and its pulley G from dropping down too far. The other part of the chain or rope F is held out of the way by passing around a grooved pulley, K, pivoted to the end of a bar, L, upon the outer end of which is formed a hook or eye to enable the end of a rope, M, to be conveniently attached to it. The rope M passes over a pulley, N, pivoted to a bow or clevis, O, which is passed over the end of a screw-post, P, or over a hook formed upon or attached to said post P. The line M is held in place upon the pulley N by a line-holder, Q R, which consists of a wing, Q, pivoted in the fork or notch of a plate, R, in such a way that the edges of said wing Q may shut down against the arms of the plate R, and thus hold the said line M. The wing Q is held in place by a spring connected with its pivot and with the plate R, as shown in dotted lines in Fig. 1. The line-holder Q R thus holds the endless chain or rope F in place, and enables any slack to be conveniently taken up. S are the scrapers, which are made of a single plate of iron or steel, provided with holes or sockets to receive wooden handles, and with ears to receive the draft-chain. The draft-chain of the scrapers S is provided with a hook to enable it to be conveniently connected with the endless chain F.

Any desired number of the scrapers S may be connected with the endless chain F.

The scrapers S may be filled and emptied at any required points of the circuit of the chain F, and the position of the said chain F may be readily shifted by moving the screw-posts from one place to another.

In the line-holder Q R may be formed a socket to receive a wrench for turning the nuts of the apparatus, so that it may be always at hand when required.

Having thus described my invention, I claim as new, and desire to secure by Letters Patent—

1. The grading apparatus consisting of the driving-shaft A, bevel-gear wheels C D, spur-wheel or pulley E, endless chain or rope F, pulleys G K, arms or bars H L, screw-posts I P, and scrapers S, one or more, constructed and arranged to operate, in connection with each other, substantially as herein shown and described.

2. The combination of line M, pulley N, clevis O, and line-holder Q R with the screw-post P and arm and pulley L K, that hold the endless chain F of the apparatus, substantially as herein shown and described.

OLE MATSON.

Witnesses:
GUSTAF GUSTAFSON,
C. E. BLOMQUIST.